United States Patent [19]

Nakada

[11] Patent Number: 4,754,360

[45] Date of Patent: Jun. 28, 1988

[54] ARC EXTINGUISHING APPARATUS HAVING SENSING OF INITIAL ARC

[75] Inventor: Ryosaku Nakada, Ohbu, Japan

[73] Assignee: Nipponkouatsudenki Kabushikikaisha, Nagoya, Japan

[21] Appl. No.: 848,187

[22] Filed: Apr. 4, 1986

[30] Foreign Application Priority Data

May 7, 1985 [JP] Japan .................................. 60-96473
May 14, 1985 [JP] Japan .................................. 60-102206

[51] Int. Cl.⁴ ............................................ H02H 7/20
[52] U.S. Cl. ............................................ 361/8; 361/13
[58] Field of Search ............................................ 361/2-13, 361/111, 117

[56] References Cited

U.S. PATENT DOCUMENTS

| | | | |
|---|---|---|---|
| 3,648,110 | 3/1972 | Knight | 361/111 X |
| 3,869,648 | 3/1975 | Zendle et al. | 361/111 X |
| 4,031,432 | 6/1977 | Proctor | 361/7 |
| 4,038,584 | 7/1977 | Tarchalski et al. | 361/2 X |
| 4,363,060 | 12/1982 | Stich | 361/13 X |
| 4,389,691 | 6/1983 | Hancock | 361/3 X |
| 4,445,183 | 4/1984 | McCollum et al. | 361/13 X |
| 4,525,762 | 6/1985 | Norris | 361/13 |

FOREIGN PATENT DOCUMENTS 39-25702 11/1964 Japan .

*Primary Examiner*—A. D. Pellinen
*Assistant Examiner*—A. Jonathan Wysocki
*Attorney, Agent, or Firm*—Pollock, Vande Sande & Priddy

[57] ABSTRACT

An apparatus for extinguishing the arc which occurs between a pair of electrodes separated in the switchgear when the high voltage loaded switchgear is opened. The earliest arc is detected which occurs between a pair of electrodes. When the earliest arc is detected, a gate signal is transmitted to a pair of thyristor connected anti-parallel between a pair of electrodes. Then among those thyristors, a thyristor located in the forward direction relative to the polarity of power supply becomes conductive. As a result of the thyristor being conductive, the arc occuring between a pair of electrodes is eliminated.

1 Claim, 4 Drawing Sheets

ARC EXTINGUISHING APPARATUS HAVING SENSING OF INITIAL ARC

BACKGROUND OF THE INVENTION

1. Field of The Invention

This invention relates to a switchgear used for opening or closing the line by interposing it in the high or extra-high voltage transmission line or power distribution system, and more particularly to a switchgear used for opening the circuit while the current flows through said line or for connecting the loads to the line and more specifically to a method for extinguishing the arc which generates during the switching action between a pair of fixed and movable electrodes within the switch.

2. Description of The Prior Art

A construction as shown in FIG. 6 is known as an art of this sort. In case, in such a construction, a movable electrode 42 is connected to a fixed electrode 41, in the high voltage switchgear 40, an alternating current flows from the high voltage power supply 43, e.g. high voltage line which leads to the substation through the above-mentioned electrodes 41 and 42 to the load 44 e.g. high voltage distributing line which leads to consumers. In this case, when the current is cut off, a movable electrode is drawn out from the fixed electrode in the direction of the arrow. In this process, when the movable electrode 42 is separated from the fixed electrode 41, if a polarity of the power supply voltage is directed in the forward direction relative to a diode 46, a current which directs from the fixed electrode 41 toward the movable electrode 42 is shifted from the fixed electrode 41 through a resistance 47, diode 46 and an auxiliary electrode 45 to a bypass directing toward the movable electrode 42.

Subsequently, when said supply voltage obtained an inversed polarity, the current which passes said bypass is cut off. Since at this stage the movable electrode 42 is separated from the auxiliary electrode 45, the arc is not generated between those electrodes 42 and 45. Of course, the current does not flow between said electrodes 42 and 41. The above-mentioned art is known, e.g. in Japanese Patent Laid-Open No. 39-25702 (page 1, right column line 6 to 19).

However, the circuit of above switchgear 40 is not always opened when the supply voltage displayed the polarity as described but following cases can occur: when the movable electrode 42 is separated from the fixed electrode 41, a polarity of the supply voltage can display an inversed direction relative to the diode 46, in which case since the diode 46 is cut off, an arc is generated between electrodes 41 and 42. The arc continues while the above-mentioned polarity is inverted, e.g. for a half cycle of the alternating current. Thus both electrodes suffer from a great damage due to the application of heat caused by the arc which continues over a long time.

Furthermore, while the arc is generated as mentioned above, the movable electriode 42 is separated from the fixed electrode 41. Consequently, the arc generated between both electrodes 41 and 42 is increased until the atmosphere between both electrodes is ionized. The atmosphere thus ionized encourages a reignition between elctrodes 41 and 42 when subsequent to the supply voltage having attained a value of 0 v. a polarity is inversed. Thus the arc is again generated between both electrodes, further intensifying the damage of both electrodes.

SUMMARY OF THE INVENTION

An object of this invention is to provide a method for preventing the damage of electrodes wherein when the movable electrode is separated from the fixed electrode the arc which can generate therebetween is extinguished at the early stage.

A further object of the invention is to provide a method for extinguishing the arc at the early stage as mentioned above irrespective of the polarity of AC supply voltage when the arc starts to generate.

A still further object of the invention is to provide a method for securely extinguishing the arc by synchronizing the generation thereof with the extinguishing action.

According to the present invention, when an arc starts to generate between the fixed and movable electrodes, the arc is detected and one of a pair of thyristors which had previously been connected between said both electrodes becomes conductive. Those thyristors are connected anti-parallel and a thyristor is conductive which is directed forwardly relative to the polarity of supply voltage. Thanks to the condition of the above thyristor, the current flows through the thyristor between said both electrodes with the result that said arc is promptly extinguished.

As described above, since immediately after the early arc being detected the arc is extinguished, timings between the start of formation of arc and extinguishing action coincide precisely with each other. Consequently, the arc which has started to generate can be extinguished securely and yet irrespective of the polarity of supply voltage, as a result of which a marked damage of them can securely be prevented.

Other objects and advantages of the invention will become apparent during the following discussion of the accompanying drawings.

DESCRIPTION OF THE PREFERRED EMBODIMENTS

Figure 1:
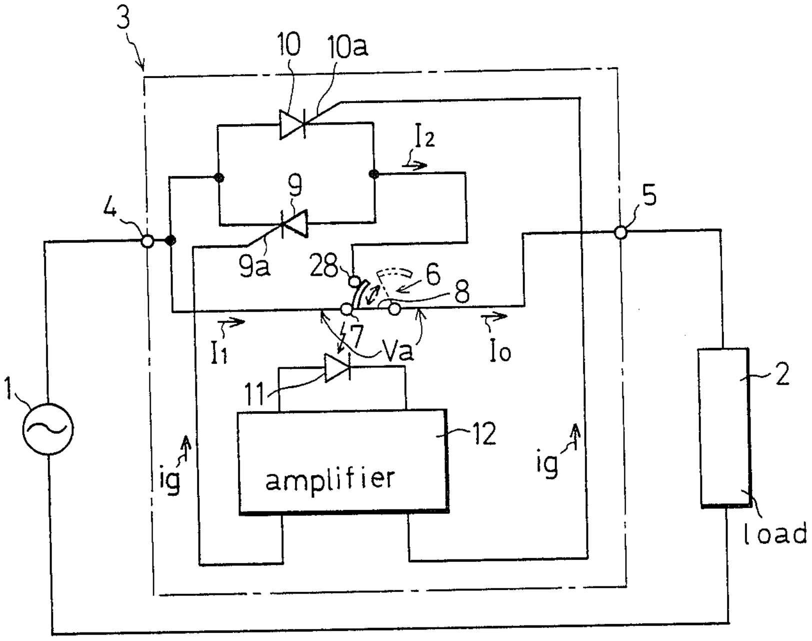
FIG. 1 shows a block diagram illustrating a connection circuit between the power supply, load and a high voltage loaded switchgear.

In FIG. 1, a reference numeral 1 shows a single to three phase high voltage AC power supply which voltage is over, for example, 3000 v., 2 a load and 3 a high voltage loaded switchgear which is interposed between the power supply and the load. A reference numeral 3*a* shows a sealed case made of the metal or the like, 4 a terminal at the side of the power supply, 5 a terminal at the side of the load, 6 a switching portion which is provided within the case, comprising a fixed electrode 7, an auxiliary contactor 28 and a movable electrode 8. 9 and 10 show thyristors which is connected anti-parallel as shown. These are connected parallel between said fixed electrode 7 and the auxiliary contactor 28. 9*a* and 10*a* show trigger terminals (gates). 11 is a light receiving element, which, by detecting the arc generating between the fixed and movable electrode 7 and 8, emit the electric signals and a photodiode or avalanche photodiode is used for that purpose. 12 shows an amplifier. The so-called optical module can be used for the portion which is composed of the light receiving element 11 and the amplifier 12.

Figure 2:
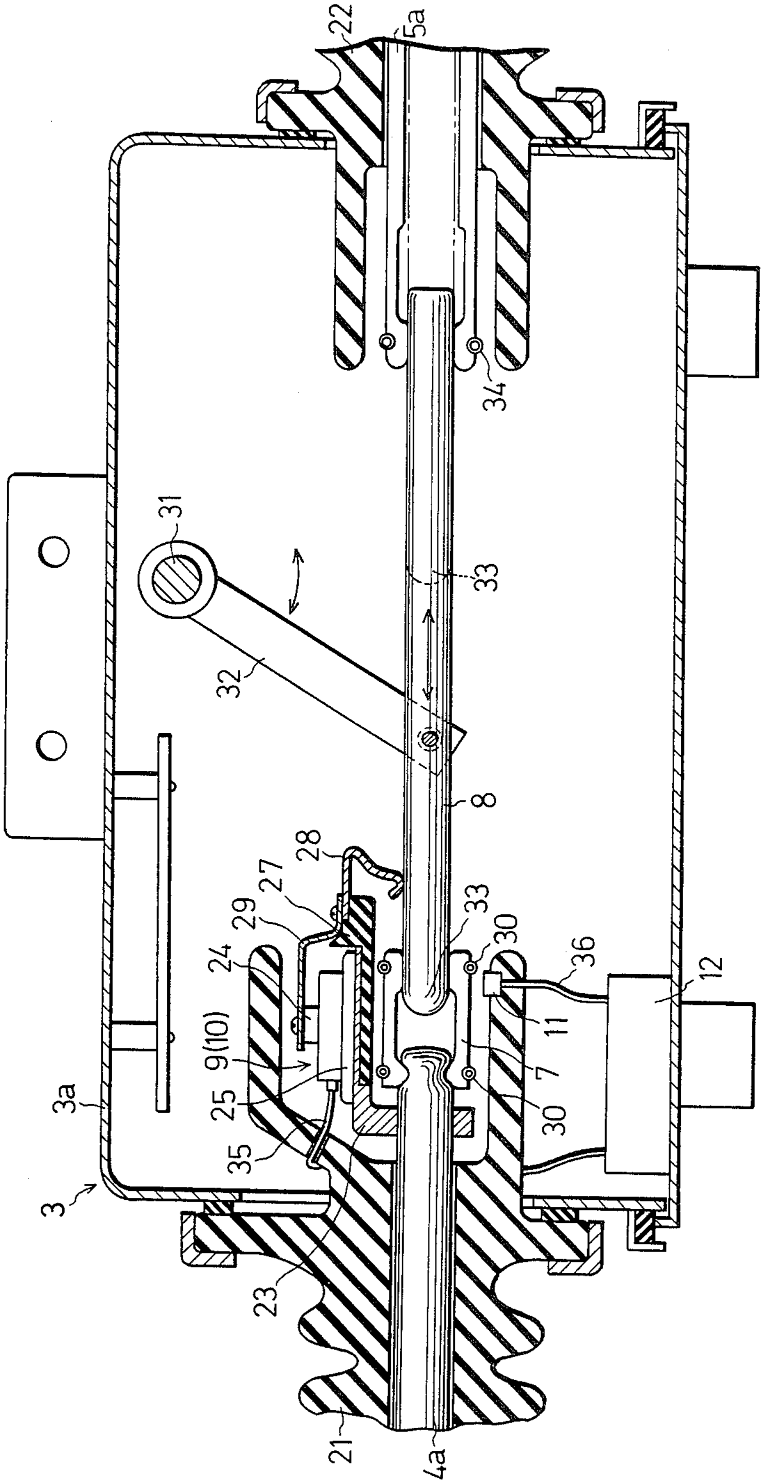
FIG. 2 shows a longitudinal cross sectional view illustrating a construction of the high voltage loaded switchgear of FIG. 1.

In FIG. 2 a concrete construction of said high voltage loaded switchgear 3 is shown. In the case 3*a* bushings 21 and 22 are mounted which are made of the insulating material such as porcelain or the epoxy resin or the like. A terminal bar 4*a* penetrates the bushing and is fixed. Said fixed electrode 7 is mounted at one end of said terminal bar 4*a*. The fixed electrode 7 has a construction so-called tulip type electrode wherein a plurality of elements are arrayed about the contral axis of the terminal bar 4*a* and about its circumference a spring 30 is disposed for tightening purpose. The other end of terminal bar 4*a* serves as the connection terminal 4 described above. An electrode 5*a* having a similar construction as said fixed electrode 7 penetrates the bushing 22. The above movable electrode 8 is formed in the form of the rod and is retractibly inserted into the interior of said electrode 5*a*. At the outer periphery of one end of the electrode 5*a*, a spring 34 is provided for tightening purpose. The other end portion of electrode 5*a* serves as the above connection terminal 5. A switching shaft 31 is rotatable inserted into the case 3*a*. A lever 32 is mounted to the above shaft 31 within the interior of case 3*a*. The end of the lever 32 is coupled to the movable electrode 8, so that, by reciprocally rotating the shaft 31, the electrode retractes in the direction of the arrow. A handle for manual operation is mounted to said shaft 31 at the exterior portion of the case 3*a*.

A mounting piece 23 made of a conductive material is fixed to the terminal rod 4*a*. Above thyristors are both mounted to this piece 23. In FIG. 2 the thyristor 10 is hidden beyond the thyristor 9. In the thyristor 9 a cathode 25 is electrically connected to the mounting piece 23 while in the thyristor 10 an anode is electrically connected to the mounting piece 23. A support body 27 made of a insulative material is mounted to the mounting piece 23 while the auxiliary contact piece 28 which contacts the movable electrode 8 is mounted to the support body 27. The auxiliary contact piece 28 is connected by the connecting piece 29 to the anode of the thyristor 9 and the cathode of the thyristor 10. Each gate of thyristors 9 and 10 is connected by a lead 35 to the amplifier 12. The light receiving element 11 is mounted to the bushing 21 adjacent the electrode 7 so that the arc between electrodes 7 and 8 can be detected and connected to the amplifier 12 by a lead 36.

Figure 3:
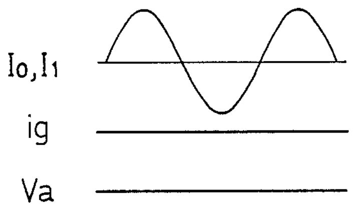
FIG. 3 shows a wave form illustrating the operation of the high voltage loaded switchgear of FIG. 1.
Figure 3:
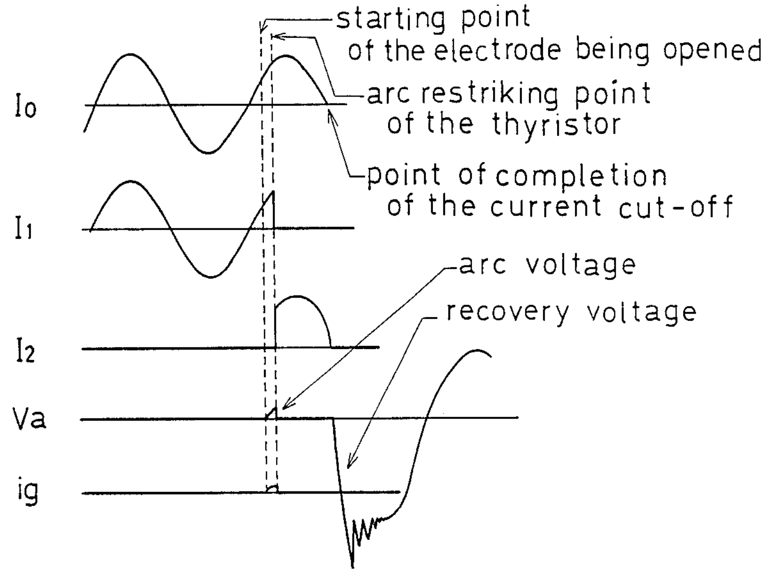
Figure 3:
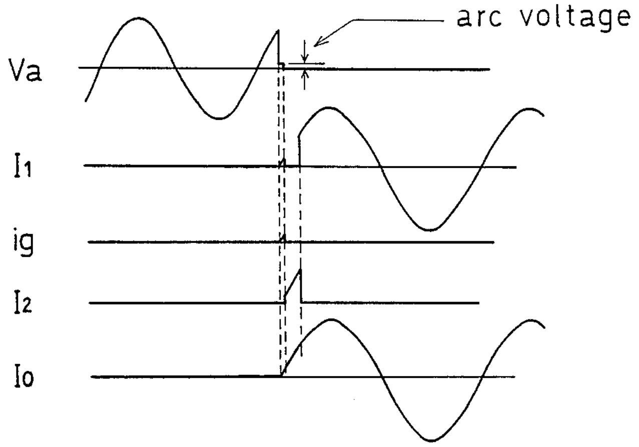

With the above construction, in the closed condition of the switchgear 3 shown i.e. in the condition in which the fixed and movable electrodes 7 and 8 are connected, the current from the AC power supply 1 flows from the power supply terminal 4 through the terminal rod 4*a*, fixed electrode 7, movable electrode 8, electrode 5*a* and the terminal 5 at the side of the load to the load 2 (For the current $I_O$, $I_l$, ig and the voltage Va for each portion see FIG. 3(A).).

The operation when the switchgear 3 is opened is as follows (see FIG. 3(B)). When the shaft 31 is rotated, the movable electrode 8 starts to move from the condition shown in FIG. 2 to the right at a speed of 1 to 3 m per second. When the end 33 of the movable electrode 8 is separated from the fixed electrode 7, the arc starts to be generated between the end 33 and the fixed electrode 7. By detecting its initial arc the element 11 transmits the electric signal to the amplifier, which in turn correspondingly transmits a trigger signal to the trigger terminals 9*a* and 10*a* of thyristors 9 and 10. Besides, by the arc being generated the arc voltage (see FIG. 3(B)) is produced between the fixed and movable electrodes 7 and 8 and is applied between the anode and the cathode of thyristors 9 and 10. When, as shown above, trigger signals (gate signals) are transmitted to the thyristors 9 and 10 and when the arc voltage is applied between those anodes and cathodes, either of thyristors 9 or 10 become conductive, depending on the then electric polarity which is assumed between the fixed and movable electrode 8 (The arc voltage immediately, after the generation of arc, reaches the lowest operation voltage of the thyristor.). Then between the electrode rod 4 and the movable electrode 8 a passageway which passes the mounting piece 23, conductive thyristor 9 or 10, connecting piece 29 and auxiliary contact piece 28 (see $I_2$ of FIG. 3(B)). As a result, the intermediate portion between the fixed electrode 7 and the end 33 of the movable electrode 8 becomes voltage-free, thus the arc being extinguished. Presently when the phase of the power supply 1 becomes 0° or 180° and the voltage becomes zero between terminals 4 and 5, above conductive thyristors 9 or 10 will be off (see $I_2$ of FIG. 3(B)) as a result of which the current is cut off between connecting terminals 4 and 5 (see $I_o$ of FIG. 3(B)). It is preferable that the time required from the generation of arc to the ignition and conduction of the thyristor (arcing time) be short as much as possible, but several mili seconds or less is preferred.

Subsequent thereto because the movable electrode 8 moves further to the right, its end 33 is presently separated from the auxiliary contact piece 28 (The separating point is when or after 20 mili seconds have lapsed after the movable electrode 8 is separated from the fixed electrode 7.) However, because at that time the thyristor 9 or 10 has already been off, the arc will not be caused there even if the end 33 is separated from the auxiliary contact piece 28. Since, in this manner, the end 33 reaches the position shown by the imaginary line, the intermediate portion between connecting terminals 4 and 5 is completely opened without thyristors 9 and 10 being electrically enterposed between terminals 4 and 5. In this way, the power supply is cut off to the load 2. Because at most only the current of half wave flows through the thyristors 9 and 10, a small current rating (capacity), for example, 30A will be sufficient for them (The instantaneous conduction is possible up to approximately 600A).

Next, the operation when the switchgear 3 is closed is as follows (see FIG. 3(C)). When the shaft 31 is rotated in the direction opposite to the above case, the movable electrode 8 moves to the left from the position shown by the imaginary line and first, the end 33 contacts the auxiliary contact piece 28. In this case, since thyristors 9 and 10 are off, no phenomena occur. Presently when the end 33 approached the fixed electrode 7 extremely, the arc caused by the preceding discharge takes place between them. This arc is detected by the light receiving element 11 and a signal for the trigger (see ig of FIG. 3(C)) is transmitted through amplifier 12 to the gate of thyristors 9 and 10. At the same time since, as shown, the voltage is applied by the arc voltage to thyristors 9 and 10, the thyristor 9 or 10 ignite and the current flows to the thyristor (see $I_2$ of FIG. 3(C)), as a result of which the above arc is extinguished. When the movable electrode 8 moved further to the left and the end 33 contacted the fixed electrode 7 completely, the current flows between electrodes 7 and 8 (see $I_1$ of FIG. 3(C)). Thus the voltage to be applied between the anode and cathode of thyristors 9 and 10 becomes zero and the current which flows through the thyristor falls below its holding current, thereby thyristor becoming off.

In the above switchgear, instead of the above amplifier 12 a gate signal generator may be used. In that case, it may convert detection signals transmitted from the above light receiving element 11 into the continuous gate signals and transmit the continuous gate signals to the gates of above thyristors 9 and 10. At the same time when the light receiving element detect the generation of arc, it starts to generate the above gate signals and while the above arcing continues, the gate signals is continuously generated even if arcing is temporarily discontinued. The above signal generator may be driven by the charging type battery or by AC 100 v. obtained by stepping down the other power supply 1.

The switchgear operates as follows when the gate signal generator is used. When arcing takes place between the movable and fixed electrodes 8 and 7, signals for trigger are continuously applied to above thyristors 9 and 10. Thus the arc current is generated between movable and fixed electrode 7 and 8 and as soon as the arc voltage there exceeds the lowest operation voltage of the thyristor, the thyristor 9 or 10 becomes conductive. Consequently, the arc extinguishing action caused by the conduction of thyristors is synchronized precisely with the arcing time, as a result of which the arc can be extinguished at the earliest possible stage.

Figure 4:
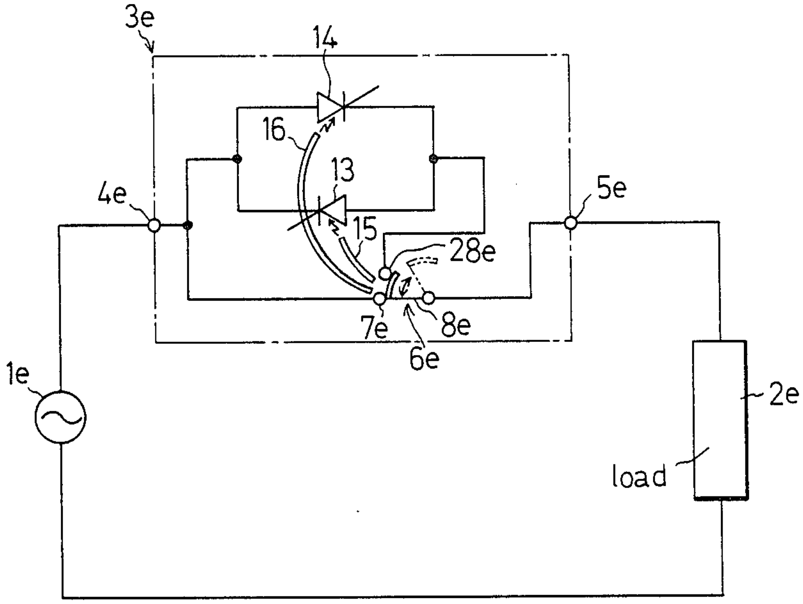
FIG. 4 shows a block diagram illustrating a connection circuit between the power supply, load and another high voltage loaded switchgear according to the present invention.
Figure 5:
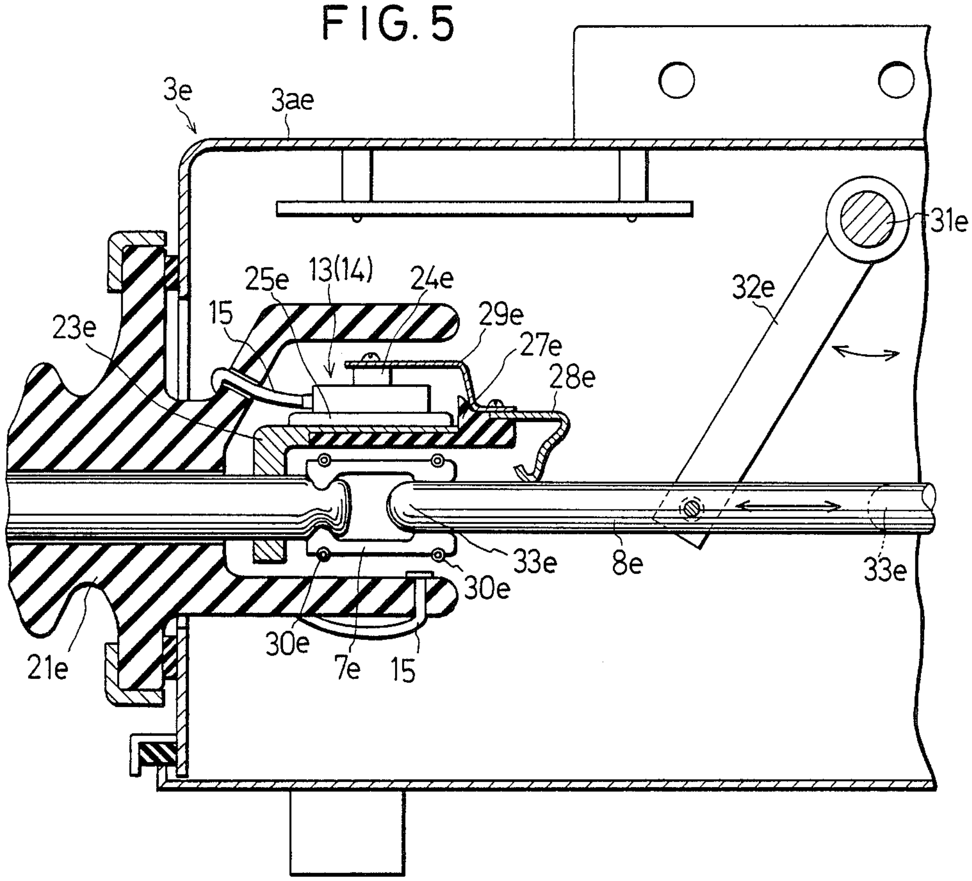
FIG. 5 shows a longitudinal cross sectional view illustrating a portion of the high voltage loaded switchgear of, FIG. 4.
Figure 6:
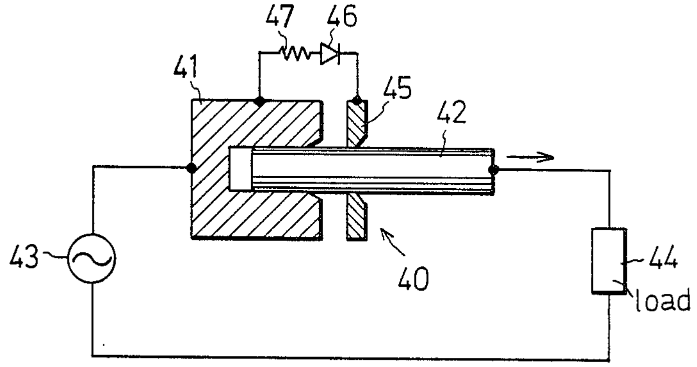
FIG. 6 is a cross-sectional view showing a conventional switchgear.

In FIG. 4 and FIG. 5 examples are shown wherein optical thyristors 13 and 14 are used for extinguishing the above arc. These thyristors 13 and 14 have a light receiving portion as a gate for the same being ignited so that by the light being exposed it may ignite. Above thyristors 13 and 14 are mounted to the mounting piece 23*e* in the similar way as in above thyristors 9 and 10. To the light receiving portion of both thyristors 13 and 14 one end of light guides 15 and 16 (optical fibers) is each connected. Each other end of those light guides 15 and 16 is respectively fixed to the bushing 21*e* adjacent both electrodes 7*e* and 8*e* as a means for detecting the earliest arc which occur between the fixed and movable electrodes 7*e* and 8*e*.

With such a construction, as soon as the earliest arc occurs between the fixed and movable electrodes 7*e* and 8*e*, the arc light is transmitted as a gate signal through light guide 15 and 16 to thyristors 13 and 14 as a result of which, in the same manner as in the above case, depending on the polarity of power supply, one of those thyristors 13 and 14 becomes conductive, to thereby extinguish the arc.

According to the circuit constructed as above, the gate signal circuit of the thyristor is simplified while there is no need to take a means for insulating it into consideration.

According in embodiments shown in FIG. 4 and FIG. 5 alphabetical subscript 37 e" are added to the same simbols as in preceding drawings in portions which can be considered to be functionally identical or equivalent construction with preceding ones.

As many apparently widely different embodiments of this invention may be made without departing from the spirit and scope thereof, it is to be understood that the invention is not limited to the specific embodiments thereof except as defined in the appended claims.

What is claimed is:

1. An apparatus for extinguishing an arc which occurs between a pair of electrodes which are separated from each other in a high voltage loaded switchgear interposed between an AC power supply and a load when said switchgear is opened, comprising, first and second separable electrodes, an auxilary contact means, a pair of anti-parallel connected thyristor means connected in parallel between said first electrode and said auxiliary contact means, each said thyristor means having an anode, cathode, and gate, and said anode and cathode of each thyristor means being connected between said said first electrode and said auxiliary contact means, means for separating said electrodes from each other by moving said second electrode away from said first electrode, said second electrode contacting said aauxiliary contact means for the first part of its movement until it moves far enough away from said first electrode so as to be out of contact with said auxiliary contact means, means responsive to the electromagnetic energy generated by an initial arac which occurs when said electrodes begin to be separated from each other for activating the gate of each thyristor means, whereby a current path is created between said first electrode and said second electrode which is contacting said auxiliary contact means, so that said initial arc is extinguished, and means for turning said thyristor means off while said second electrode is still in contact with said auxiliary contact means so that when said second electrode moves out of contact with said auxiliary contact means, there is no arcing between said second electrode and said auxiliary contact means, said thyristor means becoming disconnected from between said first and second electrodes when said second electrode moves out of contact with said auxiliary contact means.

* * * * *